United States Patent [19]

Murakami et al.

[11] Patent Number: 5,296,963
[45] Date of Patent: Mar. 22, 1994

[54] APPARATUS AND METHOD FOR APPLYING A LASER BEAM THROUGH A MICROSCOPE

[75] Inventors: Sei Murakami; Masao Takai; Ryusei Nakano; Nobuo Kimura, all of Kudamatsu, Japan

[73] Assignee: Hitachi, Ltd., Tokyo, Japan

[21] Appl. No.: 842,517

[22] Filed: Feb. 27, 1992

[30] Foreign Application Priority Data

Feb. 27, 1991 [JP] Japan .................................. 3-032607
Dec. 5, 1991 [JP] Japan .................................. 3-321691

[51] Int. Cl.⁵ ...................... G02B 21/06; G02B 26/10; C12N 5/10; C12N 13/00
[52] U.S. Cl. ..................................... 359/389; 359/385; 359/202; 219/121.8; 435/173.1; 435/240.2
[58] Field of Search ............... 359/389, 385, 368, 201, 359/202; 219/121.8; 435/173, 204.2

[56] References Cited

U.S. PATENT DOCUMENTS

| | | | |
|---|---|---|---|
| 3,705,755 | 12/1972 | Baer | 359/201 |
| 4,204,748 | 5/1980 | Yonekubo | 350/228 |
| 4,515,447 | 5/1985 | Weimer et al. | 359/389 |
| 5,013,660 | 5/1991 | Kasuya et al. | 435/173 |

FOREIGN PATENT DOCUMENTS 0101572 2/1984 European Pat. Off. .
2754498 5/1980 France .
2216744 10/1989 United Kingdom .

OTHER PUBLICATIONS

R. Weigand et al, "Laser-Induced Fusion . . . ", *Jour. of Cell Science*, vol. 88, 1987, pp. 145-149.

*Primary Examiner*—Jon W. Henry
*Attorney, Agent, or Firm*—Antonelli, Terry, Stout & Kraus

[57] ABSTRACT

An inverted microscope is adapted so that a specimen thereon e.g. cells can be irradiated by a laser beam. The laser beam is guided from a laser source by a series of adjustably movable reflectors which introduce it into the microscope optical pathway at a parallel-beam region thereof, and through the objective lens of the microscope. A point to be irradiated can be selected by moving the reflectors which may be galvanometrically-movable. The laser beam can be focused together with the microscope image. The movable reflectors are kept within 200 mm behind the objective lens principal plane (PP) to ensure that the laser can be applied all over the microscope viewing field.

18 Claims, 4 Drawing Sheets

APPARATUS AND METHOD FOR APPLYING A LASER BEAM THROUGH A MICROSCOPE

FIELD OF THE INVENTION

This invention relates to apparatus and methods for applying a laser beam through a microscope, in particular an inverted microscope.

BACKGROUND OF THE INVENTION

It is known to adapt an optical microscope so that a specimen on the specimen station thereof can be irradiated with a laser beam. The laser beam is directed through the objective lens of the microscope and onto the specimen, so that the viewing and irradiation can be coordinated.

DISCUSSION OF PRIOR ART

One popular application is in laser irradiation of living cells. JP-B-7837/1987 describes this, and suitable apparatus.

See FIG. 1. The known system is for controllable laser irradiation of a sample using a conventional (erect) microscope. Optics of the microscope are shown schematically as an eyepiece 20' leading to an objective lens 4' positioned above a microscope platform 10'. A sample container 11' contains a DNA solution with cells 5 which are to be laser irradiated. WD indicated a working distance which is the spacing between the end of the objective lens 4' and the cell 5. A laser source 1 is positioned near the microscope and the laser beam 101 is introduced behind the objective lens 4' using galvanometer-controlled mirrors 2',3'. The final mirror 3' is positioned in-line between the objective lens and eyepiece 20'.

In order to focus the image of the cells 5, and to be able to focus the laser beam on the cells, the cells and solution must be at the working distance (WD) from the objective lens. The working distance WD is very small; usually less than 1mm. If the cells and solution are placed in a standard petri dish, the apparatus cannot be used because, even if the dish is filled with solution, most cells will sink to the bottom and thus be more than 1mm away from the objective lens. Accordingly it has been the practice to use a special all-enclosed dish 11' and stick the cells by some means to its top surface. This also means that the container 11' must be completely filled with the DNA solution so that it contacts the cells all the time. As a result a large amount of DNA solution is necessary, while a normal petri dish used for culturing cannot be used.

In operation, the movement of one or both of the galvanometer-controlled mirrors is adjusted to direct the laser beam onto the desired location within the field of viewing. In this way it is possible e.g. to create micropunctures in cells to allow foreign DNA to enter, in a manner which is in itself known.

Particularly with biological work, many of the problems mentioned above are known to be avoidable by use of an inverted microscope. This is a microscope in which the front end of the objective lens faces upwards, beneath the sample stage.

Accordingly, Journal of Cell Science 88,145-149 (1987) describes use of an inverted microscope with a laser for inducing fusion of cells. The described apparatus uses a Zeiss IM35 inverted microscope. A standard microscope illumination system involves an angled half-mirror positioned in the microscope optical path whereby the specimen can be illuminated e.g. for observation of fluorescence. This standard illumination source has been replaced with a dye laser which is directed onto the angled mirror. The optical pathway in an inverted microscope is very complicated. In order to focus the laser beam on the specimen, the authors of this prior document had to position a lens in the laser beam path before the angled mirror, and abandon any adjustability of the laser beam direction itself. The position of laser irradiation could only be selected by the horizontal XY adjustment of the specimen stage.

SUMMARY OF THE INVENTION

It has not previously been perceived to be possible to use the control of laser beam direction in an inverted microscope, even though considerable advantages would be achievable if this were done. The relative advantages associated with inverted microscopes are generally known to the skilled person. Some of them are explained later with reference to FIG. 2. It should also be noted that, since inverted microscopes have become particularly associated with biological applications, a number of special accessories such as micromanipulators have been made for use with them. It has been a problem that direction-controlled laser irradiation could not be used with an inverted microscope so that these other benefits could not also be enjoyed.

The present inventors have, for the first time, provided apparatus in which a laser beam, remote-controllable as to direction, can be used in conjunction with an inverted microscope with the laser beam passing through the objective lens of the microscope.

Accordingly in one aspect the invention provides microscope apparatus adapted for directing a laser beam onto a specimen, comprising an inverted microscope having an objective lens and at least two laser beam deflectors mounted optically behind the objective lens on a laser beam path of the apparatus, characterised in that each laser beam deflector is controllable to adjust the direction of the laser beam path through the objective lens.

In particular, the inventors have found that if a parallel-beam region is selected or created in the microscope's own optical pathway, behind the objective lens, then that region can serve for the introduction, via a deflector, of the laser beam such that the laser beam can be focused by the objective lens, without necessarily needing any auxiliary lens near the deflector, and also be movable by means of adjusting one or more deflectors along its path.

In one embodiment, the deflector which is positioned in the optical path of the microscope is itself one of the adjustable deflectors. Usually there are two or more controllable deflectors positioned along the laser beam pathway, so that one deflector can make directional adjustments in an X direction and the other in a Y direction.

Galvanometer-controlled reflectors can be used for the laser beam deflection. The skilled person is familiar with these and will be able to put them into operation.

In a more specific aspect, the invention provides microscope apparatus for directing a laser beam onto a sample comprising:

a laser source;

at least two controllably-movable direction-adjustable laser beam deflectors mounted, optically behind an objective lens of the microscope, along a laser beam path leading from the laser source, and an inverted microscope having an optical pathway, and said objective lens through which both the optical pathway and the laser beam path pass, a final one of said at least two laser beam deflectors being mounted in the inverted microscope optical pathway, behind the objective lens.

The laser source itself may be of a known type.

We have found that for effective operation over the viewing field of the microscope, certain precautions are preferably taken with respect to the distance of the laser beam deflectors behind the objective lens. If one of the controllable deflectors is too far back from the objective lens along the laser pathway, the lateral displacement of the laser beam at the objective lens, for a given angular deflection, may cause it to be blocked by the objective lens structure Specifically, we find that a preferred field of operation of the laser beam is achieved if all deflection adjustments of the laser beam direction are kept within 200mm behind the object principal plane of the objective lens, measured along the laser path.

In a further aspect, we provide microscope apparatus comprising an inverted microscope having a sample station, an objective lens mounted axially movably beneath the sample station for focusing the optical pathway of the microscope, and fixed microscope structure beneath the objective lens, the apparatus being adapted for directing a laser beam onto the sample station by means of a remotely-controllable movable laser beam deflector mounted between the fixed microscope structure and the objective lens.

This is consistent with the conventional inverted microscope construction, in which the sample station is a stage which is horizontally movable, but is fixed (in the axial sense of the objective lens) relative to the main optical sub-structure of the microscope. The situation is quite different from the old-fashioned upright microscope, in which the specimen stage can move up and down relative to the entire assembly.

In a further aspect, the invention provides a method of directing a laser beam onto a selected portion of a specimen at a specimen station of an inverted microscope, characterised by deflecting the laser beam through the objective lens of the inverted microscope, with focusing of the laser beam, selecting said portion, and adjusting one or more deflectors, used to deflect the laser beam, so as to direct it onto said selected portion of the specimen.

As mentioned above, the deflectors may be electrically remote-controllable galvanometer-movable mirrors.

The laser direction control may be used in a number of ways. As before, it is always possible to move the specimen stage of the microscope itself, if a suitably sophisticated microscope is available. However, movement of the specimen stage is limited in speed, owing to its mass. The present invention may allow for a high-speed scanning movement of a laser beam across the stationary specimen, or of responsive sequential selection of a number of individual points e.g. using a stylus or the like on a touch-responsive screen display showing the field of view of the microscope.

It will be appreciated that the present invention has particular applicability to biological and microbiological experiments e.g. for the purposes of puncturing cells to introduce genetic matter therein.

BRIEF DESCRIPTION OF THE DRAWINGS

Embodiments of the invention are now described in detail by way of example, and with reference to the accompanying drawings in which.

DETAILED DESCRIPTION OF PREFERRED EMBODIMENTS

Figure 1:
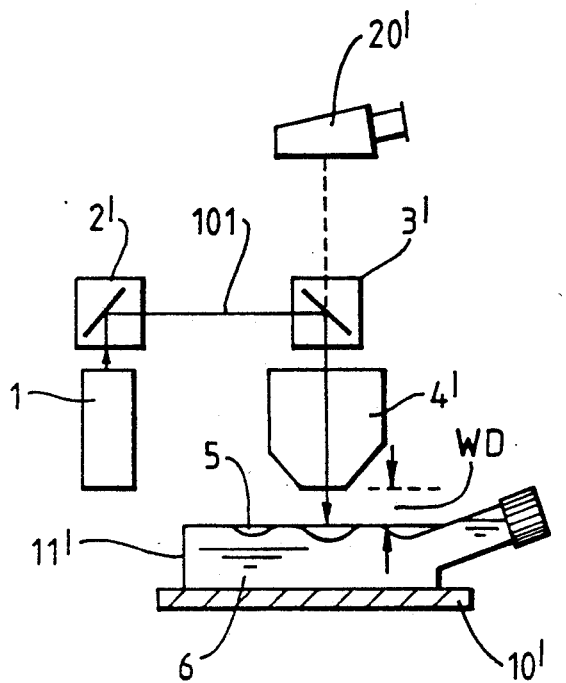
FIG. 1 is a schematic view showing a conventional laser/microscope irradiation set-up.
Figure 2:
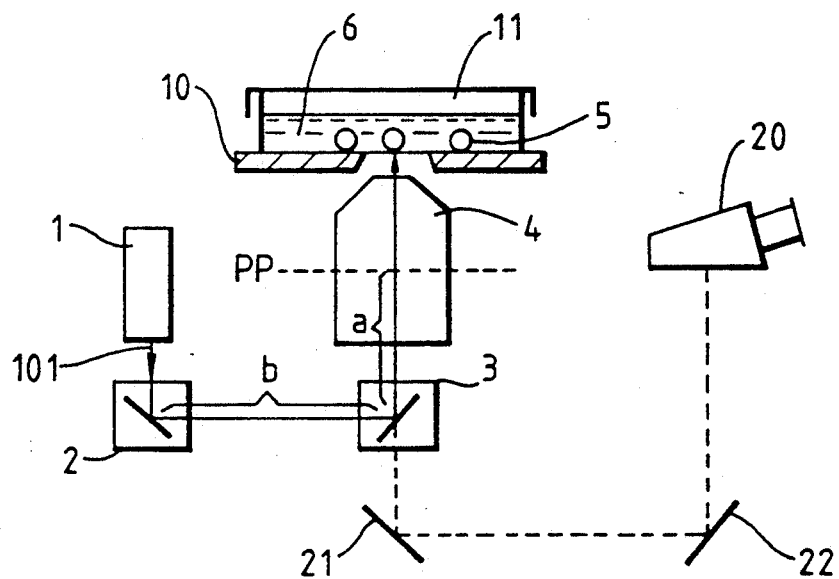
FIG. 2 is a schematic view showing main elements of a laser/microscope irradiation set-up embodying the invention.

FIG. 2 is a schematic view illustrating features of an apparatus embodying this invention. Instead of an erect microscope, an inverted microscope is used.

The complicated optical construction of an inverted microscope is shown schematically in FIG. 2 as a pathway from an eyepiece 20 (directed downwardly) via first and second major reflectors 22,21 and then upwardly to a vertically-aligned objective lens 4 positioned beneath a sample stage 10. Further reference should be made to FIG. 3 in which the dotted-line box 30 encloses components which are generally fixed relative to the basic structure of the microscope. The sample stage 10 is movable in a horizontal plane (X and Y directions) as suggested by arrow B. This is conventional to enable different portions of the sample to be viewed. The objective lens unit 4 is movable in the vertical sense relative to the fixed microscope structure, as indicated by arrow A, so that the microscope image can be focused It will be seen that in the inverted microscope, an ordinary petri dish 11 can be used since cells 5 will normally sink to the bottom of the solution 6 in which they are treated, and are thus presented at a flat surface adjacent the objective lens of the microscope.

Figure 3:
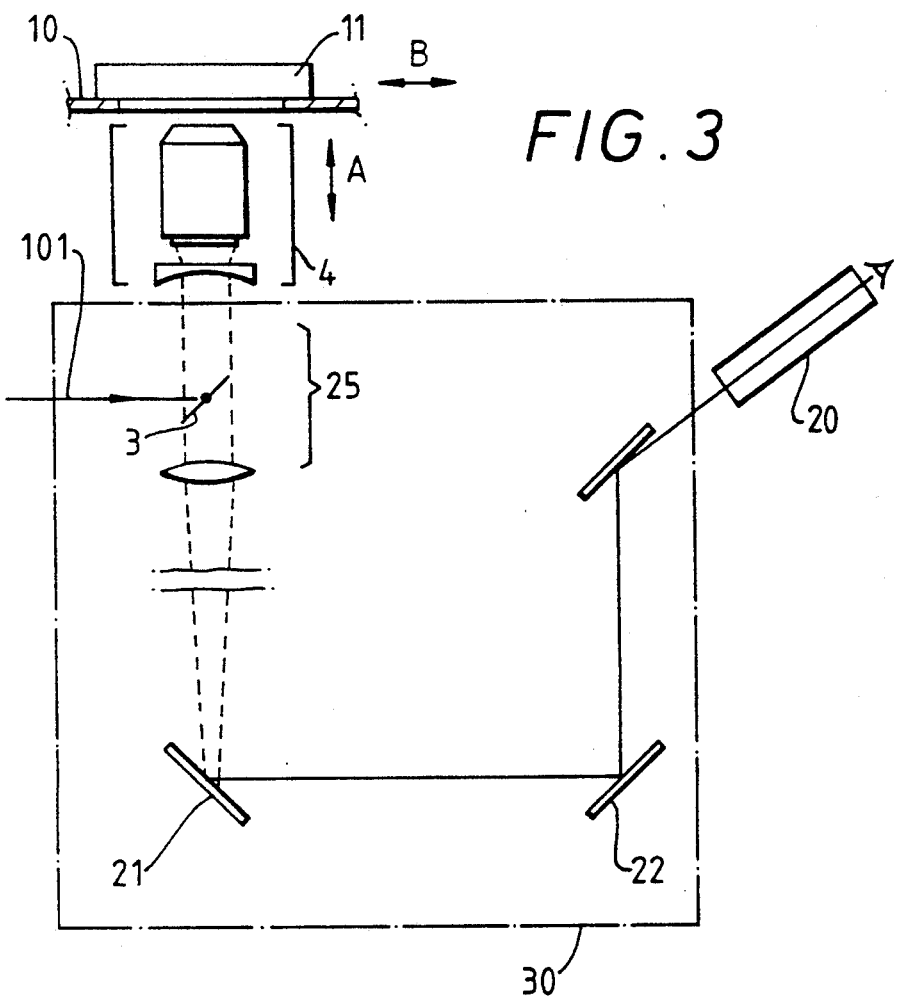
FIG. 3 is another schematic view, more detailed as regards the microscope and showing where a laser deflector is positioned.

FIG. 2 also indicates a laser source 1 which may be the same as previously used in such applications First and second galvanometer-controlled mirrors 2,3 are also provided. The first mirror 2 is positioned towards the laser source 1 and outside the microscope structure. The second mirror 3 serves to introduce the laser beam 101 into the optical path of the microscope and is accordingly positioned directly in line behind the objective lens 4. The broken lines in FIG. 3 illustrate schematically how the optical path behind the objective lens of an inverted microscope typically has variation between convergent and divergent regions In the present case there is a parallel region 25 where the rays are parallel, and the second mirror 3 is positioned in the optical path of the microscope in this parallel portion 25.

Inverted microscopes usually have a parallel region for focusing movements. However it is usually too small or obstructed for a deflector: this is one reason why the skilled person did not realize that the present invention could be made.

In a purpose-built inverted microscope, in view of the present teachings, it is possible to arrange that the optical path includes a parallel light portion where the deflector can be positioned. However there are existing microscopes, such as the Olympus IMT-2 inverted microscope, which already include a preferable parallel portion in the optical path behind the objective lens. Such an existing microscope can conveniently be adapted for use with the present invention In the aforenamed Olympus IMT-2 the parallel portion coincides with the position of a mirror for introducing light for generally illuminating the sample e.g. for fluorescence experiments. Other inverted microscopes, such as that shown in the above-mentioned J.Cell Science 88,145–149 (1987), have the light-introducing mirror at a non-parallel region. We have adapted such a microscope by replacing the conventional mirror with a controllably movable mirror, e.g. galvanometer-controlled mirror 3, suitable for reflecting a directed laser beam in an adjustable desired direction.

Because the beam is introduced at a parallel portion of the optical path, it is possible to focus both the laser beam and the viewed image of the sample simultaneously. No diverging or converging lens is needed on the laser path near the deflector 3, so the construction can be kept simple and, most importantly, small.

In this embodiment, both the mirrors 2,3 are controllably movable to direct the laser beam. In their embodiments, the mirror 3 positioned in the microscope optical path may be fixed and the movement achieved by one or more movable mirrors along the laser path, but not interposed in the microscope optical path.

It is an important feature of the apparatus that all of the movable mirrors 2,3 for guiding the laser beam 101 are positioned sufficiently optically near behind the objective lens 4. "Behind" in this context does not necessarily mean physically disposed behind, but rather optically behind i.e. along a light path extending from the rear end of the objective lens assembly. The reasons for this are newly appreciated and are described below.

Figure 4:
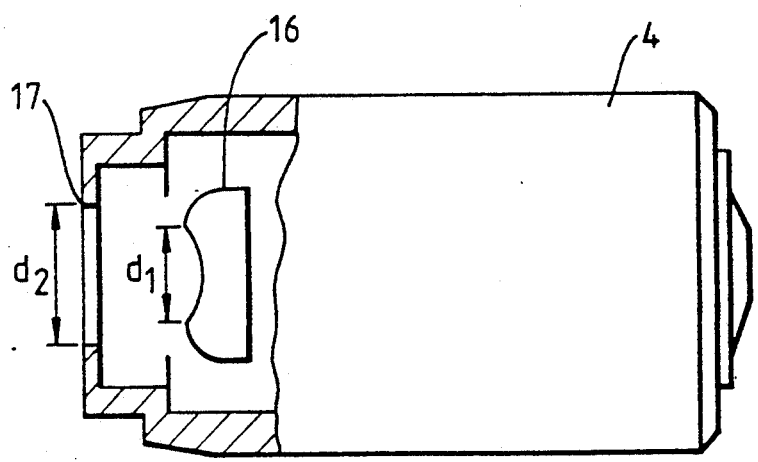
FIG. 4 is a schematic side view of an objective lens assembly, broken away schematically at the rear end to show an aperture and lens.

FIG. 4 shows schematically an objective lens of a standard type. The lens is in reality a number of lenses contained within a casing with a rear opening 17 which screws into the microscope apparatus. If a laser beam enters the objective lens 4 from behind it enters intact provided that its diameter is less than the diameter $d_2$ of the aperture of the casing. However its diameter must also be less than the working diameter $d_1$ of the first lens 16 which it meets inside the objective lens. In some lenses the casing aperture $d_2$ will govern the maximum variation, but in most cases the size of the first lens 16 is the critical factor. Provided the laser beam has a diameter smaller than $d_1$, it will not be shut out. When however the beam deflection point is further back along the optical path, the possibility arises that the beam or part of the beam may be shut out. Usually the beam diameter is ⅓ to ¼ of the diameter of the critical aperture d. The longer the distance between the mirror deflecting the beam and the aperture d, the less the possible angle of deflection before shutting out, and the smaller the area on the sample surface to which the laser beam can be applied.

Considering this in more detail, it should first be understood that the assembly of lenses in an objective lens can, by means of routine calculation, be considered as a single lens positioned at a position known as the object principal plane. This is marked as "PP" in FIG. 2: its actual position varies from one lens assembly to another.

Figure 5:
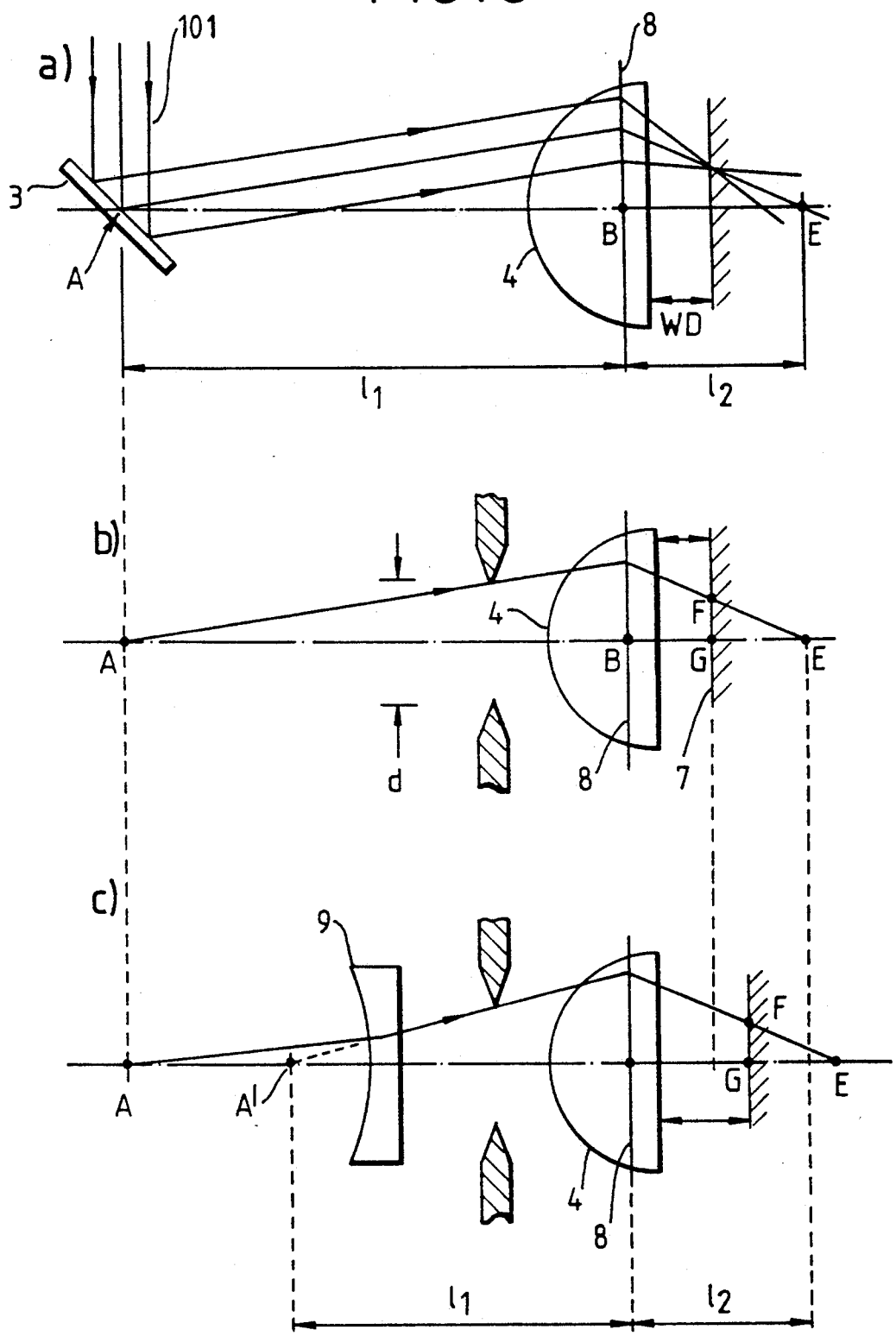
FIG. 5($a$), ($b$) and ($c$) show the behaviour of an introduced laser beam under varying circumstances at an objective lens.

The relation between a distance $l_1$ between an optical path deflector and the principal plane of an objective lens is considered with reference to FIG. 5.

FIG. 5(a) shows a sample surface 7, an adjacent objective lens 4 having a principal plane 8, and a laser beam deflector 3, all positioned in line along the optical path of a microscope. The beam is being focused by the lens 4 on the sample surface 7, over the working distance WD. $l_1$ is the distance from the object principal plane 8 to the center of the reflector 3 (AB) and $l_2$ is the distance BE according to the standard refraction equation (1):

$$\frac{1}{l_1} + \frac{1}{l_2} = \frac{1}{f} \quad (1)$$

in which f is the focal length of the objective lens 4. Whether or not a deflected beam is shut out at the lens depends upon the critical aperture d, discussed above. This factor is shown schematically as an aperture in FIG. 5(b). FIG. 5(b) simplifies FIG. 5(a) to a situation in which the laser beam diameter is regarded as very small. A range $2 \times FG$ as shown in FIG. 5(b) is therefore the maximum field over which the laser can be applied. Any further deflection of the laser results in its being cut out by the aperture d.

In an inverted microscope, a compensating lens is commonly provided in front of the objective lens 4, because objective lenses for inverted microscopes are not designed for operation with parallel light (unlike those in some special erect microscopes). FIG. 5(c) shows the compensating lens 9. In this case the calculation is altered with the actual position A of the most distant movable reflector 3 being adjusted to a virtual position A' resulting from the compensating lens 9, and the distance $l_1$ being adjusted accordingly.

Calculations were made by this method to determine the relation between the distance $l_1$ and the area to which a laser can be applied using an inverted microscope. The calculation was made firstly for an object lens of 20× magnification having an aperture (d) of 6.8mm and a focal length of 3.93mm for the laser beam wavelength in question. Another calculation was made for an object lens of 40× magnification with d as 10.8mm and the focal length of 7.62mm for the relevant wavelength. These are commonly-used lenses.

Figure 6:
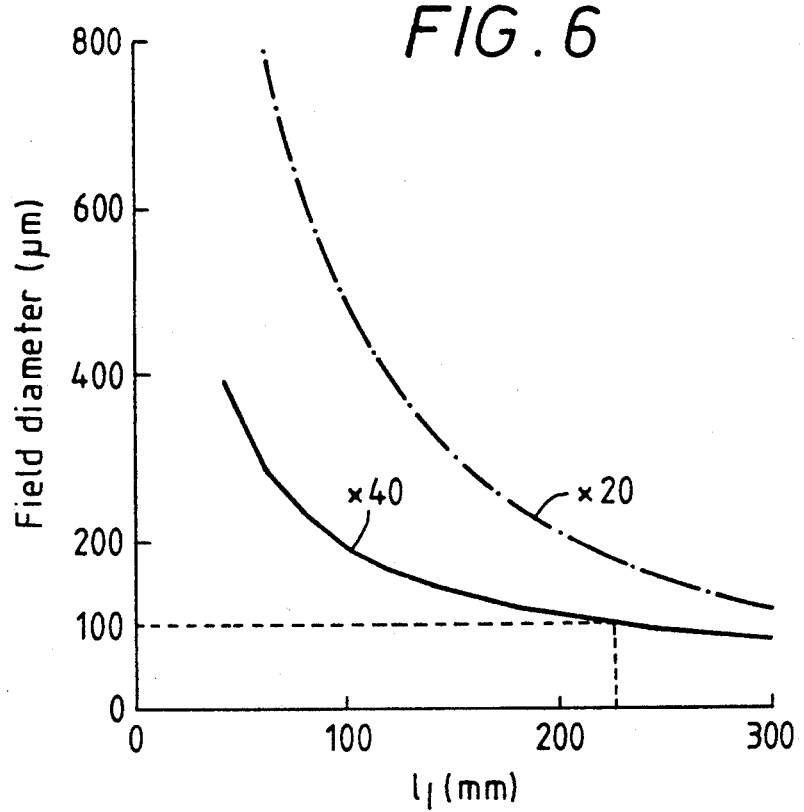
FIG. 6 shows a relation between $l_1$ of FIG. 5 and an area to which a laser beam can be applied for two magnitudes of objective lens.

FIG. 6 shows the results obtained A field to be scanned e.g. on a monitor television set, may be an area of e.g. 100μm across. It is seen that, with a ×40 lens, a distance $l_1$ should therefore not be more than 220mm otherwise the laser beam will be shut out from the edges of the scannable field.

Figure 7:
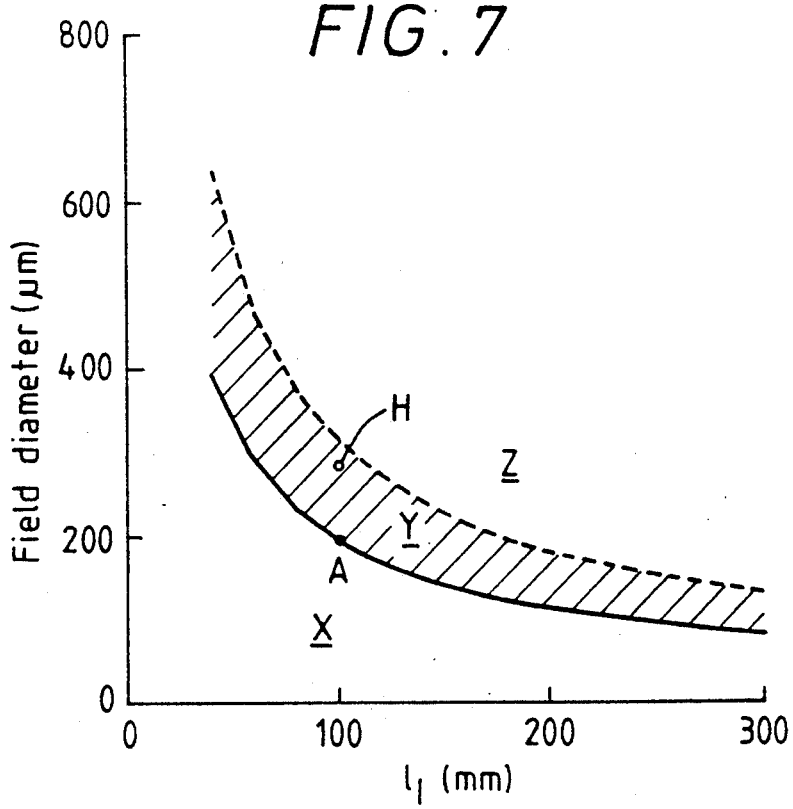
FIG. 7 shows the influence of laser beam diameter on the relationship of FIG. 6.

FIG. 6 assumes a laser beam of negligible diameter In fact, a laser beam typically has a diameter of a few millimeters FIG. 7 shows a developed calculation for a ×40 lens with a laser beam 2mm in diameter. The solid line is as in FIG. 6. The broken line is a boundary at which none of the beam will reach the sample. In region X, more than half of the beam can hit the sample over the entire viewed field. In region Y, less than half of the beam will hit the sample over the entire viewed field. In region Z, there will be parts of the field at which none of the laser beam hits the sample. In practice, operation in region X is feasible provided that the laser beam energy is sufficient for only part of the beam to perform the desired function In an experiment, with $l_1$ set at 100mm, it was found possible to perforate living cells using even a low energy laser beam, over a field about 200μm across. This experiment (point A) agrees with the calculated value. With a higher level of laser energy, even a part of the laser beam may be sufficient to perforate cells. Accordingly the area to which the laser beam could be applied increased to around 300μm across (point H).

The broken line in FIG. 7 uses calculated values obtained with the laser beam diameter taken into consideration by notionally increasing the aperture d of the objective lens by an amount corresponding to the beam diameter.

We claim:

1. Microscope apparatus adapted for directing a laser beam onto a specimen, said apparatus comprising:
   an inverted microscope, said microscope comprising an objective lens;
   means defining a laser beam path of the apparatus, said laser beam path passing through the objective lens of the microscope;
   said defining means comprising at least two laser beam deflectors mounted on said laser beam path optically behind said objective lens, and being controllably adjustable to adjust the direction of the laser beam path through the objective lens as the apparatus is operated;
   said inverted microscope defining a microscope optical pathway, the microscope optical pathway comprises a parallel-beam region behind the objective lens, and the laser beam path meets the microscope optical pathway at said parallel-beam region.

2. Microscope apparatus as claimed in claim 1 in which a said controllably adjustable laser beam deflector is located at said parallel-beam region.

3. Microscope apparatus adapted for directing a laser beam onto a specimen, said apparatus comprising:
   an inverted microscope, said microscope comprising an objective lens;
   means defining a laser beam path of he apparatus, said laser beam path passing through the objective lens of the microscope;
   said defining means comprising at least two laser beam deflectors mounted on said laser beam path optically behind said objective lens, and being controllably adjustable to adjust the direction of the laser beam path through the objective lens as the apparatus is operated;
   two said laser beam deflectors being provided, each of said two deflectors being adjustable in a respective different sense whereby said deflectors produce mutually perpendicular adjustments of the laser beam path direction.

4. Microscope apparatus for directing a laser beam onto a sample, comprising:
   a laser source,
   an inverted microscope, said microscope comprising an objective lens and defining an optical pathway passing through said objective lens;
   means defining a laser beam path from said laser source and extending through the objective lens of the inverted microscope, said means comprising at least two remote-controllably direction-adjustable laser beam deflectors;
   a final one of said at least two laser beam deflectors being mounted in the microscope optical pathway, behind the objective lens.

5. Microscope apparatus as claimed in claim 4 in which all of said remote-controllably direction-adjustable laser beam deflectors lie within 200mm behind the object principal plane of the object lens, along the laser optical path.

6. Microscope apparatus as claimed in claim 4 in which said remote-controllably direction-adjustable laser beam deflectors comprise reflectors movable by galvanometers.

7. Microscope apparatus as claimed in claim 4 in which two said laser beam deflectors respectively provide adjustment of the laser beam path direction in mutually perpendicular senses.

8. An inverted microscope defining an optical pathway and comprising
   a sample station;
   an objective lens mounted axially movably underneath the sample station, on said optical pathway, for focusing said pathway at the sample station;
   fixed microscope structure beneath said objective lens and defining at least part of said optical pathway, and
   a remote-controllable adjustable laser beam deflector mounted in the optical pathway between the fixed microscope structure and the objective lens.

9. An inverted microscope as claimed in claim 8 in which the optical pathway comprises a parallel-beam region, and the laser beam deflector is situated in the parallel-beam region.

10. An inverted microscope as claimed in claim 8 in which the laser beam deflector comprises a galvanometer-movable reflector element.

11. An inverted microscope as claimed in claim 8 in which the laser beam deflector is axially fixed relative to the fixed microscope structure and the sample station.

12. A method of directing a laser beam onto a selected portion of a specimen at a specimen station of an inverted microscope, the method comprising:
    deflecting a laser beam through an objective lens of the inverted microscope onto the specimen;
    focusing the laser beam onto the specimen by said objective lens;
    selecting a portion of the specimen to be treated with the laser beam; and
    adjusting one or more deflectors on which the laser beam is incident, to direct the laser beam onto the selected portion of the specimen;
    the inverted microscope having an optical pathway comprising a parallel-beam region, and the laser beam is introduced into said optical pathway at said parallel-beam region.

13. A method of directing a laser beam onto a selected portion of a specimen at a specimen station of an inverted microscope, the method comprising:
    deflecting a laser beam through an objective lens of the inverted microscope onto the specimen;
    focusing the laser beam onto the specimen by said objective lens;
    selecting a portion of the specimen to be treated with the laser beam; and
    adjusting one or more deflectors on which the laser beam is incident, to direct the laser beam onto the selected portion of the specimen;

all adjustments of said deflectors occur within 200 mm behind the object principal plane of the objective lens of the microscope, measured along the path of the laser beam.

14. A method as claimed in claim 13, wherein one of the laser beam deflectors or each deflector is remotely adjusted electrically to guide the laser beam to the selected portion of the specimen.

15. A method as claimed in claim 13, wherein said deflectors are adjusted discontinuously between selected individual conditions, corresponding to a sequence of selected individual locations on the specimen.

16. A method as claimed in claim 13, wherein all adjustments of said deflectors occur within 200mm behind the object principal plane of the objective lens of the microscope, measured along the path of the laser beam.

17. A method as claimed in claim 13, wherein the specimen comprises cells.

18. Microscope apparatus adapted for directing a laser beam onto a specimen, said apparatus comprising:

an inverted microscope comprising an objective lens;

means defining a laser beam path of the apparatus, said laser beam path passing through the objective lens of the microscope;

said defining means including at least two laser beam deflectors mounted on said laser beam path optically behind said objective lens, and being controllably adjustable to adjust the direction of the laser beam path through the objective lens as the apparatus is operated;

wherein said two laser beam deflectors are remote-controllably direction-adjustable and lie within 200mm behind the object principal plane of the objective lens, along the laser optical path.

* * * * *